US008315626B2

(12) United States Patent
Huotari et al.

(10) Patent No.: US 8,315,626 B2
(45) Date of Patent: Nov. 20, 2012

(54) SMART WIRELESS STATION FOR IDENTIFYING A PREFERRED ACCESS POINT

(75) Inventors: Allen J. Huotari, Garden Grove, CA (US); Kendra S. Harrington, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 361 days.

(21) Appl. No.: 11/229,099

(22) Filed: Sep. 16, 2005

(65) Prior Publication Data

US 2007/0064634 A1      Mar. 22, 2007

(51) Int. Cl.
*H04W 4/00* (2009.01)
*H04B 1/18* (2006.01)

(52) U.S. Cl. .................. 455/435.2; 455/179.1

(58) Field of Classification Search .......... 455/434, 455/435.2, 464, 515, 179.1, 525, 150.1, 73, 455/160.1–170.1; 370/338, 252, 328
See application file for complete search history.

(56) References Cited

U.S. PATENT DOCUMENTS

| | | | | |
|---|---|---|---|---|
| 6,870,822 | B2 * | 3/2005 | Balogh | 370/332 |
| 2001/0023446 | A1 * | 9/2001 | Balogh | 709/229 |
| 2002/0176366 | A1 | 11/2002 | Ayyagari et al. | |
| 2003/0228842 | A1 | 12/2003 | Heinonen et al. | |
| 2004/0137908 | A1 * | 7/2004 | Sinivaara et al. | 455/452.1 |
| 2004/0203593 | A1 | 10/2004 | Whelan et al. | |
| 2005/0083899 | A1 * | 4/2005 | Babbar et al. | 370/342 |
| 2005/0105501 | A1 | 5/2005 | Oura | |
| 2005/0249129 | A1 * | 11/2005 | Goodall et al. | 370/252 |
| 2006/0221919 | A1 * | 10/2006 | McRae et al. | 370/338 |
| 2007/0281747 | A1 * | 12/2007 | Pletikosa et al. | 455/564 |
| 2009/0019141 | A1 * | 1/2009 | Bush et al. | 709/223 |

OTHER PUBLICATIONS

"Bonjour", Connect Computers and Electronic Devices Automatically, Without Any Configuration, Technology Brief, 6 pages, (Apr. 2005).
"Zeroconf", Wikipedia, http://en.wikipedia.org/wiki/Zeroconf, 3 pages, (last accessed Aug. 25, 2005).

* cited by examiner

*Primary Examiner* — Melody Mehrpour
*Assistant Examiner* — Emem Stephen
(74) *Attorney, Agent, or Firm* — Haynes and Boone, LLP

(57) ABSTRACT

Systems and methods for connecting a wireless station to a wireless network are provided. The method may include: receiving a pre-connection management signal from each of a plurality of wireless access points, each of the access points connecting an upstream network to a downstream wireless network; retrieving from each of the management signals characteristics of the access point corresponding to the management signal, the characteristics of the access point comprising information regarding the upstream network associated with the respective access point; analyzing the characteristics of the access point for each of the management signals; and based on the analysis of the characteristics of the access points, identifying a preferred access point from the plurality of access points.

20 Claims, 2 Drawing Sheets

SMART WIRELESS STATION FOR IDENTIFYING A PREFERRED ACCESS POINT

BACKGROUND OF THE INVENTION

Wireless networks for both business and home use are rapidly becoming popular. Wireless networks provide convenient networking and Internet access by eliminating the need for wired connections between computers and other network devices, e.g., routers, printers, storage devices, etc.

Wireless networks are especially convenient for users of portable wireless stations, such as laptop computers, notebook computers, personal digital assistants (PDAs), and the like. Such wireless stations can easily be transported between hotspots (locations where wireless networking/Internet access is provided). New hotspots are appearing frequently at such locations as airports, malls, coffee shops, restaurants, and hotels.

The 802.11 family of standards (WiFi) provides examples of conventional wireless networks. The 802.11 family of standards is expanding to provide enhanced features, such as more channels, better security, and greater bandwidth. An increasing variety of wireless station types based on 802.11 technologies are being developed. Many of these devices are personal computing devices. However, other types of devices, such as cameras and music recorders, are also being developed.

The connection of a wireless station to a wireless network is facilitated by an access point (AP). APs contain radio transceivers that provide wireless communication to wireless stations and also contain network interfaces, such as Ethernet ports, that provide communication to an upstream network. An AP may optionally comprise a router and/or switch, to facilitate communication among computers on the network. For example, an AP may contain an Ethernet port that facilitates connection thereof to the Internet, such as via a cable modem or a digital subscriber line (DSL) modem, and may also contain a plurality of switched ports that each facilitates communication with one or more local area network (LAN) computers.

Current 802.11 implementations require the wireless station to initiate the association with the AP. A wireless station can passively discover some information regarding available wireless networks via information elements provided in the beacon that is broadcast from each AP. If a wireless station detects more than one AP (such as when multiple beacon signals are detected), a single AP must be selected for connection. However, while some characteristics of the wireless network can be determined before the wireless station associates with the AP, many other characteristics cannot be determined until after association. In particular, the beacon signal does not currently provide any information regarding the upstream network to which the AP is connected. For example, the wireless station can determine from the beacon signal the channel number, signal strength, and SSID of the AP. However, the wireless station cannot determine whether or not the AP has an Internet connection or whether DHCP (Dynamic Host Configuration Protocol) support is available.

Some wireless stations have been provided with some form of utility to facilitate the AP selection process. For example, a utility may provide a dynamic table listing all detected APs and displaying all of the information regarding each AP that can be determined from the APs' beacons. Based on this information, the user can manually select one of the detected APs for association.

Alternatively, some utilities allow users to create one or more profiles in order to save previously associated AP information for future connections. For example, the Windows XP operating system includes a configuration utility referred to as Windows Zero Configuration. Using the Zero Configuration setup screens, a user can define multiple wireless configurations and can define a prioritization of those configurations. When searching for available wireless networks, the configuration utility will attempt to connect to any wireless networks that match the predefined configurations. These types of profiling mechanisms are limited in that they only consider the limited information about the wireless network that can be obtained from the beacon signals, without consideration of the characteristics of the upstream network. In addition, these mechanisms merely select the first AP which satisfies the requirements defined by the profile, without regard for the relative advantages provided by the other APs.

The problem of selecting an AP with which to initially associate is especially troublesome for mobile devices. These mobile devices are capable of roaming during operation and therefore may require handover from a first AP to a second AP without interruption of coverage. Handover to an AP that does not provide the necessary network services can cause a noticeable disruption in service as the mobile device attempts to associate with another AP. In the case of WiFi telephone handsets, this disruption may result in a dropped call.

Accordingly, there is a need for an improved method to enable a wireless station to select an access point from a plurality of access points for association.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. Each step may be performed by hardware, software, firmware, or combinations thereof.

Figure 1:
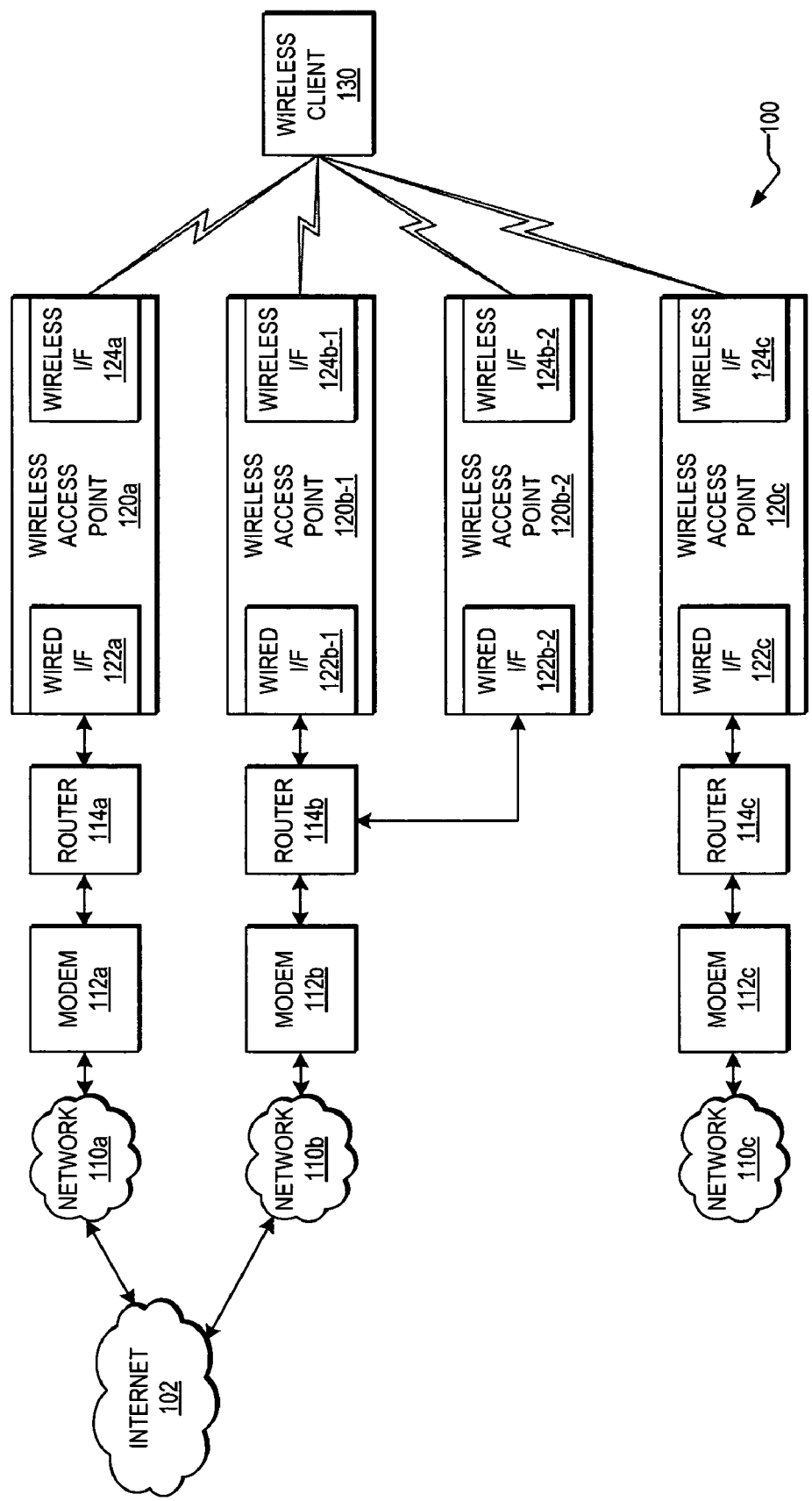
FIG. 1 is a block diagram showing an exemplary data communications network environment, in accordance with embodiments of the present invention.

FIG. 1 is a block diagram showing an exemplary data communications network environment 100, in accordance with embodiments of the present invention. In the illustrated embodiment, the network environment 100 comprises three networks 110a-110c. The first and second networks 110a-110b are connected to the Internet 102, while the third network 110c is not. Each of the networks 110a-110c is coupled to a wireless access point 120a-120c via a router 114a-114c and a modem 112a-112c. Network 110b is coupled to two wireless access points 120b-1 and 120b-2. These APs 120b-1, 120b-2 provide a wireless client 130 with multiple options for connecting to the same network 110b, but may have different characteristics (such as signal-to-noise ratio, signal strength, and the like) that the wireless client 130 may consider in identifying an AP 120 for connection. It will be understood that the environment 100 is merely exemplary, and that other configurations are possible. For example, the modems 112 and routers 114 may be implemented as separate devices or as a single unit, such as a gateway network device. In addition, multiple APs 120 may be coupled to the same router 114 or the same network 110, and may be provided on a single subnet.

Each AP 120a-120c provides wireless network connectivity for wireless stations to the upstream networks 110a-110c, respectively, via wireless local-area networks (WLAN). The APs 120 may comprise any device that allows wireless-enabled computers and other devices to communicate with a wired network. As used herein, the terms "wireless access point" (WAP) and "access point" (AP) may refer to either a standalone AP or to an AP that is integrated within another device (e.g., a router, gateway, or modem).

In the illustrated embodiment, each AP 120a-120c includes a wired interface 122a-122c and a wireless interface 124a-124c, respectively. The wired interfaces 122a-122c may comprise, e.g., a modem, a serial port, or an Ethernet port. The wireless interfaces 124a-124c may comprise, e.g., an interface compliant with the standards governed by IEEE 802.11 ("WiFi"), IEEE 802.15.1 ("Bluetooth"), ultra wideband (UWB) radio, and the like.

Multiple stations may be connected to each AP 120. In FIG. 1, a single wireless station 130 is shown. It will be understood that other wireless stations may also be connected to the APs 120a-120c in order to access the networks 110a-110c and the Internet 102. These wireless stations may comprise, e.g., personal computers (PC), telephones, laptop computers, personal digital assistants (PDA), printers, data storage devices, cameras, music storage devices, or any other device capable of communicating with a network. The wireless stations may be portable and frequently moved by users while remaining connected to the network, such as PDAs or telephone handsets, or may be relatively stationary and rarely moved during operation, such as desktop PCs or printers.

Under the IEEE 802.11 standard, when a user wishes to connect to a wireless network, the wireless station will perform a pre-connection management process, in which management signals are transmitted between any available wireless networks and the wireless station. The user may first use the wireless station 130 to scan for existing wireless networks. The scanning process may be automatic (such as when a user initially powers up a PC or WiFi telephone handset) or may be manually initiated by the user. Two types of scanning are available: passive scanning and active scanning. In passive scanning, the wireless station monitors each channel on the channel list and waits to receive beacon frames. APs may be configured to transmit beacon signals on a periodic basis.

A typical beacon frame transmitted by an AP contains the AP's service set identifier (SSID), a timestamp, a beacon interval, and supported transfer rates supported by the AP. In addition, the beacon may include parameter set data, which provides information about the specific signaling methods supported by the AP, capability data, which provides information regarding the requirements of stations wishing to connect to the AP, and a traffic indication map (TIM), which identifies stations having data frames buffered at the AP.

In active scanning, rather than passively listening for a network to announce itself with a beacon, a wireless station will actively transmit probe request frames. Any appropriately configured AP which detects a probe request will transmit a probe response. This probe response contains similar information as the beacon.

As described above, in some existing systems, the wireless station will present the user with a list of APs detected during the scanning process. The user will then select one AP to join. Alternatively, the wireless station may be configured to automatically select one of the APs based on a match between the information contained in the beacon and a preexisting profile stored on the wireless station.

Once the AP is selected, the wireless station will begin an authentication process. If the AP authenticates the wireless station, then the station will attempt to join the network by sending an association request frame containing information about the station and the SSID of the network the station wishes to associate with. After receiving the association request, the AP determines whether to grant access. If so, then the AP will establish an association ID for the station and transmit that to the station in an association response. Only after these pre-connection management steps are completed will the station be connected to the network.

Unfortunately, in these conventional systems, prior to completing the authentication process, the wireless station 130 is only able to obtain limited information about the AP 120. The beacon and probe response signals do not provide the wireless station with additional information relevant to the intended use of the wireless station 130, such as information regarding the networks upstream of the AP 120.

As described above, the AP 120 is used to connect a wireless first network with a second network (typically a wired LAN). When a user attempts to use a wireless station to join a wireless network, the user typically wishes to utilize some service or resource available on the network(s) connected to the wired interface 122 of the AP 120. These upstream networks may include a LAN, WAN, and/or the Internet. Unfortunately, the beacon and probe response signals do not provide the wireless station 130 with any information about whether the desired services are available through the AP 120. Thus, it is only after the wireless station 130 has connected to the third AP 120c that the wireless station 130 will be able to discover that the AP 120c does not provide access to the Internet 102. The wireless station 130 must then begin the scanning, authentication, and association process again with one of the other available APs 120a-120b.

Accordingly, it would be advantageous for the wireless station to learn more detailed information about the wireless network prior to connection with the AP. For example, it would be beneficial for the wireless station to discover information regarding setup features of the AP and/or services offered by the network. Such information may allow the wireless device to intelligently select the best AP for intended use and may also allow the AP to optimize each connection on a per station basis, thus providing enhanced service to the wireless station.

In accordance with embodiments of the present invention, the wireless station receives management signals from the available APs and utilizes information contained in these management signals in order to identify a preferred AP for connection. The information contained in the management signals includes information regarding the upstream network associated with the AP. Thus, the wireless station is capable of obtaining information regarding services and resources available on the upstream network prior to completing the connection process.

Figure 2:
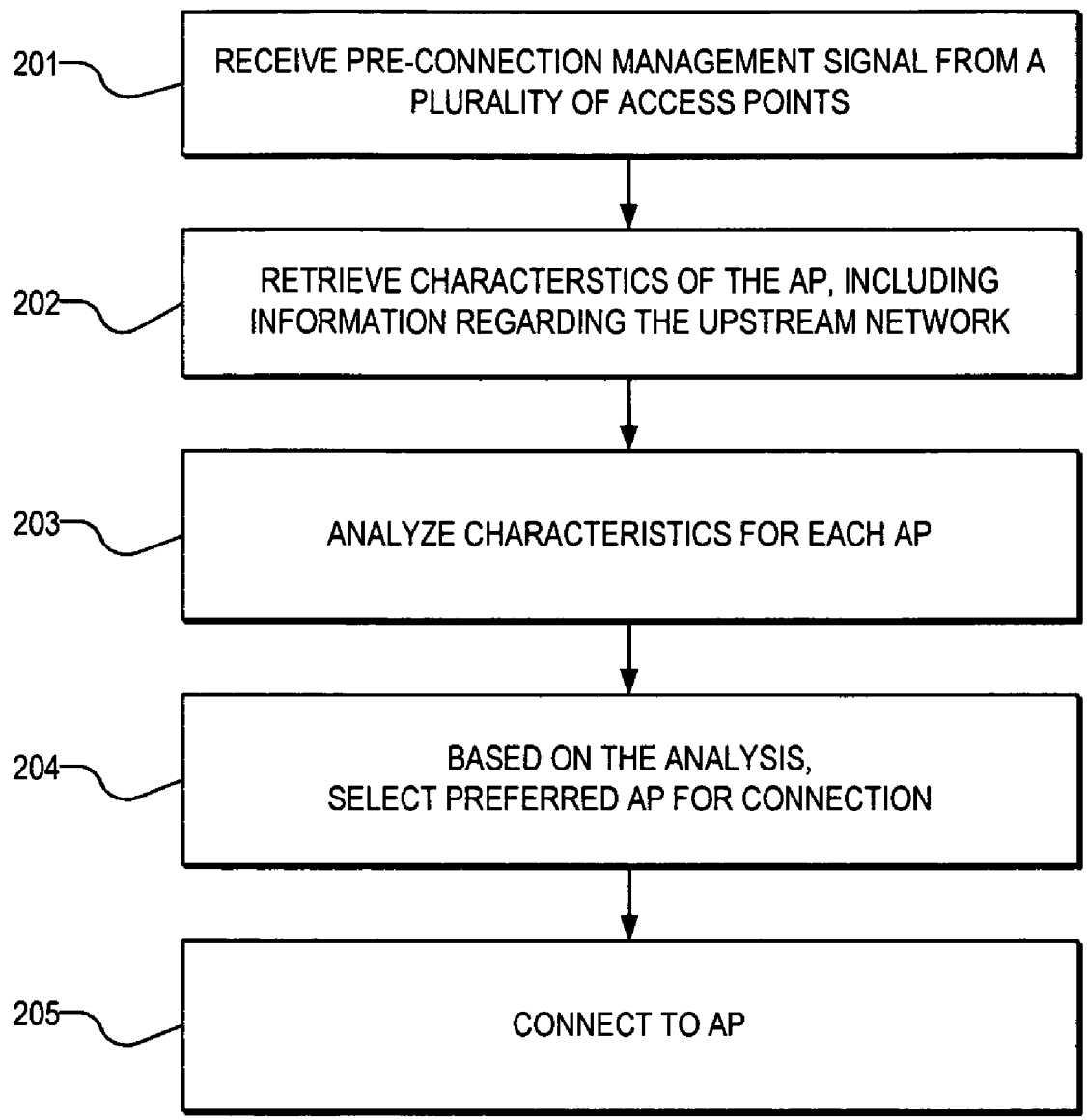
FIG. 2 is a block diagram illustrating an exemplary method of connecting a wireless station to a wireless network.

FIG. 2 is a block diagram illustrating an exemplary method of connecting a wireless station to a wireless network. In step 201, the wireless station receives a pre-connection management signal from each of a plurality of wireless access points. Each of these APs connects an upstream network to a downstream wireless network. These management signals contain data regarding characteristics of the AP, including information regarding the upstream network. In step 202, the station retrieves the characteristics of the AP from the management signal. In step 203, these characteristics are analyzed. In step 204, based on the analysis, a preferred AP is selected. In step 205, the wireless station connects to the AP.

The mechanism by which the wireless station 130 and the APs 120 communicate the pre-connection management signals may vary. Exemplary systems for communicating pre-connection management signals between a wireless station and multiple APs are described in co-pending U.S. patent application Ser. No. 11/099,046, entitled, "Wireless Connection Selection and Setup," filed on Apr. 5, 2005, and co-pending U.S. patent application Ser. No. 11/102,377, entitled, "Network Availability Status Detection Device and Method," filed Apr. 8, 2005, the disclosures of which are incorporated by reference herein in their entireties.

In some embodiments, the APs 120 are configured to transmit the information regarding the AP and the upstream network in the periodic beacon signal. In other embodiments, the APs 120 are configured to transmit the information only in response to a probe request from an appropriate wireless station 130. In yet other embodiments, the wireless station 130 may transmit a probe request requesting specific information regarding the resources and/or services available via the AP 120. The AP 120 can then respond by indicating whether those resources and/or services are available.

In various embodiments, different types of characteristics may be transmitted by the AP in the management frames prior to association between the client device and the AP. For example, the AP may transmit information regarding encryption settings, the IP address of the AP, the domain name of the AP, whether a DHCP address is available from the AP or from a resource accessible to the AP, and whether the Internet is accessible via the AP. In other embodiments, the AP may transmit information regarding SNR (signal-to-noise ratio), QoS (quality of service), WAN connection type, WAN connection speed, NAT/NAPT (network address translation/network address port translation) presence, and the identities of the owner/service provider for the wireless network/AP. Other types and combinations of information may be provided by the AP in other embodiments.

Once the wireless station 130 has received the information from all of the available APs 120a-120c, the station 130 can analyze the information to identify a preferred AP 120 for connection. In addition, the station 130 may also consider in this analysis additional information not directly provided by the APs 120a-120c, such as signal strength and signal quality. This analysis can be performed by the station 130 in a variety of ways.

For example, a user may store multiple profiles on the wireless station 130, each profile including a combination of one or more of the above-listed parameters. These profiles may be prioritized or ranked such that the station 130 will attempt to match the profiles to the detected AP characteristics, and the AP 120 that matches with the highest ranked profile will be selected as the preferred AP.

In another embodiment, the user may store parameter preferences, which can be compared to the detected AP characteristics. These parameter preferences can include a criticality rating assigned to one or more parameters. The AP that best matches these parameter preferences will be selected as the preferred AP. For example, the criticality ratings may comprise a rating of 0 to 10, with 0 corresponding to an irrelevant parameter and 10 corresponding to a required parameter. Thus, the parameter preferences may indicate that Internet access is 10, availability of DHCP services is 9, high signal strength is 5, and a specific channel number is 0. In the embodiment illustrated in FIG. 1, the first AP 120a may provide Internet access, have access to a DHCP server, but have a low signal strength, the second AP 120b also provides Internet access, no DHCP services, but has a high signal strength, and the third AP 120c does not provide Internet access, but includes a DHCP server and has a high signal strength. In this case, because Internet access has a criticality rating of 10, the third AP 120c will be deemed unacceptable. Although the second AP 120b has a greater signal strength, the wireless station 130 will identify the first AP 120a as the preferred AP because no DHCP services are provided by the second AP 120c, even though the first AP 120a has a weak signal. The channel numbers for all three APs 120a-120c are not considered in the analysis, because the channel number has a 0 criticality.

In some embodiments, the wireless station 130 may be configured to continue to scan for additional APs 120, even after a connection to a suitable AP has been established. If a new AP 120 is detected, the characteristics of the new AP 120 will be analyzed. If the wireless station 130 determines that the new AP 120 is preferable over the existing AP 120 to which the station 130 is connected, the station 130 may notify the user of the new AP 120 and query whether to switch to the new AP 120. Alternatively, the station 130 may automatically switch the connection to the new AP 120 without requiring intervention by the user. Similarly, if a change to an existing connected AP 120 is detected, then the station 130 may consider whether to switch to a different AP if the change affects a relevant characteristic and a more desirable AP is available.

In some embodiments, the wireless station 130 may identify to the user all APs detected that match any of the criteria set by the user, and provide an indication of the degree to which the APs match the criteria. The user can then use this "match percentage" to decide the AP to which the wireless station 130 should connect.

In some embodiments, applications running on the wireless station 130 may determine the viability of an AP before connecting to the AP or switching to a new AP. The wireless station 130 may consider the capabilities required by the application in assessing whether or not to select an AP for connection. For example, the wireless station 130 may be configured to only reconnect to a newly detected AP if the existing network connection is not being used. For instance, if the wireless station 130 comprises a voice over IP (VoIP) handset, then the wireless station 130 may be configured to retain the connection to the current AP for as long as a call is in progress. Only after the call is terminated will the station 130 switch the connection to a newly-detected AP having a higher ranking or preference. In some embodiments, an application running on the wireless station 130 may announce its requirements to a configuration utility used to manage the wireless connection. This utility will then incorporate the application's requirements in identifying the preferred AP for connection. In other embodiments, the configuration utility may actively detect all applications running on the wireless station 130 that may be impacted by changes to the wireless connection, and factor this detection into the identification process.

In some embodiments, the wireless station 130 may first attempt to prioritize between all of the APs that meet all of the required parameters. However, if no such APs are detected, the wireless station 130 may then attempt to prioritize between all other available APs. The wireless station 130 may provide the user with a warning that the minimum requirements cannot be satisfied.

The wireless station 130 may also provide various notifications to a user regarding the connection process. For example, after the initial scanning process, the station 130 may notify the user if an AP is detected that matches a preferred and/or required criteria set by the user. Alternatively, the station 130 may notify the user that a connection has been automatically made to an AP having parameters that match the preferred criteria set by the user.

The wireless station 130 may be provided with a user interface to receive user preferences and transmit notifications. If the station 130 comprises a PC, the user interface may comprise a graphical user interface and a configuration utility software application. If the station 130 comprises a VoIP handset, the user interface may comprise a small display screen on the handset and software operating from the handset's firmware. Other implementations are possible.

EXAMPLE 1

The wireless station 130 can be configured to connect to any wireless network that is unencrypted, connected to the Internet, and can provide a DHCP address, regardless of the SSID of the AP. The station 130 can be further configured to select the AP that has the strongest signal or has a minimum required signal-to-noise ratio. The station 130 can be further configured to only automatically reconnect to a newly detected AP if the signal is stronger by a predefined margin.

EXAMPLE 2

The wireless station 130 may be configured to only connect to a single SSID, regardless of what other wireless networks are available. This can be desirable if the user wishes to connect to only one WiFi hotspot provider. Alternatively, the station 130 may be configured to only connect to a predetermined list of SSIDs, regardless of what other wireless networks are available.

EXAMPLE 3

The wireless station 130 may be configured to only allow a high performance application (such as, e.g., a VoIP telephone call) to be initiated if the wireless signal strength and/or quality are above predetermined thresholds.

Embodiments of the present invention may provide various advantages not provided by prior art systems. In particular, the wireless station is able to select an AP for connection based on information regarding the status of the upstream network, rather than merely the status of the wireless network, as is the case with existing systems. Advantageously, this analysis is performed before the wireless station completes the connection process with an AP. This can enable the wireless station to avoid having to connect to multiple APs in search of an AP that provides the desired services and/or resources.

While the invention has been described in terms of particular embodiments and illustrative figures, those of ordinary skill in the art will recognize that the invention is not limited to the embodiments or figures described. For instance, the examples provided above describe wireless clients implementing various types of control logic for identifying a preferred AP. It will be understood that these are merely examples and that parameters detected and the methodology used for identifying a preferred AP may vary.

In addition, the wireless station can be implemented in a variety of ways. For example, the wireless station may comprise a VoIP handset including control logic for analyzing the management signals from the APs. Alternatively, the wireless station may comprise a PC coupled to a WiFi transceiver. The PC may include a connection utility software program for analyzing the management signals and providing the desired functionality. Other variations are possible.

Various methods and systems in accordance with the present invention may be suitable for use in small office/home office (SOHO) networks as well as other environments, such as in an enterprise network. The precise configuration and scale of the network in which these systems and methods are utilized may vary.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially as described above.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method of connecting a wireless station to a wireless network, comprising:

prior to associating to a preferred access point from among a plurality of wireless access points, receiving a pre-connection management signal from each of the plurality of wireless access points, wherein:
    each of the wireless access points connects an upstream network that is upstream of the access point to a downstream wireless network that is downstream of the access point, and
    each of the pre-connection management signals conveys information regarding services available from the upstream network that connects to the wireless access point corresponding to the pre-connection management signal;

from each of the received pre-connection management signals, retrieving characteristics of the wireless access point corresponding to the pre-connection management signal, wherein:
    the characteristics comprise information regarding an availability status of an internet connection of the upstream network that connects to the wireless access point corresponding to the pre-connection management signal;

for each wireless access point for which the characteristics have been retrieved, evaluating the characteristics of the wireless access point, wherein the evaluating includes:
    comparing each of the characteristics of each wireless access point to a stored criticality rating for each characteristic;
    comparing the wireless access points that have the characteristic with the highest criticality rating;
    among the wireless access points that have the characteristic with the highest criticality rating, comparing those wireless access points that have the characteristic with the next lower criticality rating; and
continuing the previous comparing for each lower criticality rating; and
based on the evaluation of the characteristics of the wireless access points for which the characteristics have been retrieved, identifying the preferred access point from the plurality of wireless access points, wherein the preferred access point is among the wireless access points that have been compared from highest criticality rating to lowest criticality rating.

2. The method of claim 1, wherein:
the pre-connection management signal from each of the plurality of access points comprises a beacon signal.

3. The method of claim 1, further comprising:
transmitting a probe request signal;
wherein the pre-connection management signal from each of the plurality of access points comprises a probe response signal.

4. The method of claim 1, further comprising:
notifying a user if the characteristics of the access point retrieved from a management signal satisfy a predetermined network profile.

5. The method of claim 1, wherein said evaluating the characteristics of the access point derived from each of the management signals comprises:
defining a desired network profile;
for each of the management signals, comparing the characteristics of the access point to the desired network profile; and
identifying the access point most closely corresponding to the desired network profile.

6. The method of claim 5, further comprising:
indicating to a user a correspondence between each of the access points and the desired network profile.

7. The method of claim 1, wherein said evaluating the characteristics of the access point derived from each of the management signals comprises:
defining a plurality of profiles, each of the profiles corresponding to one or more desired network characteristics and having an associated rank;
for each of the management signals, comparing the characteristics of the access point to the desired network characteristics in the plurality of profiles; and
identifying the access point corresponding to the highest ranked profile.

8. The method of claim 1, further comprising:
detecting an additional management signal from an additional access point, said additional access point connecting an upstream network to a downstream wireless network;
retrieving from the additional management signal characteristics of the additional access point, said characteristics comprising information regarding the internet connection of the upstream network associated with the additional access point;
comparing the characteristics of the additional access point to the desired network characteristics in the plurality of profiles; and
if the additional access point corresponds to a profile having a higher rank than the previously identified access point, connecting to the downstream wireless network of the additional access point.

9. The method of claim 1, wherein:
the characteristics comprise one or more of the following: a Service Set Identity (SSID), a channel number, a wireless signal strength, a wireless signal quality, encryption settings, an Internet Protocol (IP) address of the access point, a domain name of the access point, and availability of a Dynamic Host Configuration Protocol (DHCP) address for the wireless station.

10. A wireless station, comprising:
an interface for wireless connection with a wireless access point; and
control logic configured to:
prior to associating to a preferred access point from among a plurality of wireless access points, receive a pre-connection management signal from each of the plurality of wireless access points, wherein:
each of the wireless access points connects an upstream network that is upstream of the access point to a downstream wireless network that is downstream of the access point, and
each of the pre-connection management signals conveys information regarding services available from the upstream network that connects to the wireless access point corresponding to the pre-connection management signal;
from each of the received pre-connection management signals, retrieve characteristics of the wireless access point corresponding to the pre-connection management signal, wherein:
the characteristics comprise information regarding an availability status of an internet connection of the upstream network that connects to the wireless access point corresponding to the pre-connection management signal;
for each wireless access point for which the characteristics have been retrieved, evaluating the characteristics of the wireless access point, wherein the evaluating includes:
comparing each of the characteristics of each wireless access point to a stored criticality rating for each characteristic;
comparing the wireless access points that have the characteristic with the highest criticality rating;
among the wireless access points that have the characteristic with the highest criticality rating, comparing those wireless access points that have the characteristic with the next lower criticality rating; and
continuing the previous comparing for each lower criticality rating; and
based on the evaluation of the characteristics of the wireless access points for which the characteristics have been retrieved, identify the preferred access point from the plurality of wireless access points, wherein the preferred access point is among the wireless access points that have been compared from highest criticality rating to lowest criticality rating.

11. The wireless station of claim 10, wherein:
the pre-connection management signal from each of the plurality of access points comprises a beacon signal.

12. The wireless station of claim 10, wherein:
said control logic is configured to transmit a probe request signal; and
the pre-connection management signal from each of the plurality of access points comprises a probe response signal.

13. The wireless station of claim 10, wherein:
said control logic is configured to notify a user if the characteristics of the access point retrieved from a management signal satisfy a predetermined network profile.

14. The wireless station of claim 10, wherein:
said control logic is configured to evaluate the characteristics of the access point for each of the management signals by:
defining a desired network profile;
for each of the management signals, comparing the characteristics of the access point to the desired network profile; and
identifying the access point most closely corresponding to the desired network profile.

15. The wireless station of claim 14, wherein:
said control logic is configured to indicate to a user a correspondence between each of the access points and the desired network profile.

16. The wireless station of claim 10, wherein said control logic is configured to evaluate the characteristics of the access point for each of the management signals by:
defining a plurality of profiles, each of the profiles corresponding to one or more desired network characteristics and having an associated rank;
for each of the management signals, comparing the characteristics of the access point to the desired network characteristics in the plurality of profiles; and
identifying the access point corresponding to the highest ranked profile.

17. The wireless station of claim 10, wherein said control logic is further configured to:
detect an additional management signal from an additional access point, said additional access point connecting an upstream network to a downstream wireless network;
retrieve from the additional management signal characteristics of the additional access point, said characteristics comprising information regarding the internet connection of the upstream network associated with the additional access point;
compare the characteristics of the additional access point to the desired network characteristics in the plurality of profiles; and
if the additional access point corresponds to a profile having a higher rank than the previously identified access point, connect to the downstream wireless network of the additional access point.

18. The wireless station of claim 10, wherein:
the characteristics comprise one or more of the following: a Service Set Identity (SSID), a channel number, a wireless signal strength, a wireless signal quality, encryption settings, an Internet Protocol (IP) address of the access point, a domain name of the access point, and availability of a Dynamic Host Configuration Protocol (DHCP) address for the wireless station.

19. A wireless station, comprising:
an interface for wireless connection with a wireless access point; and
means for receiving, prior to associating to a preferred access point from among a plurality of wireless access points, a pre-connection management signal from each of the plurality of wireless access points, wherein:
each of the wireless access points connects an upstream network upstream of the access point to a downstream wireless network downstream of the access point, and
each of the pre-connection management signals conveys information regarding services available from the upstream network that connects to the wireless access point corresponding to the pre-connection management signal;
means for retrieving characteristics, from each of the received pre-connection management signals, of the wireless access point corresponding to the pre-connection management signal, wherein:
the characteristics comprise information regarding an availability status of an internet connection of the upstream network that connects to the wireless access point corresponding to the pre-connection management signal;
means for evaluating the characteristics of the wireless access point for each wireless access point for which the characteristics have been retrieved, wherein the means for evaluating includes means for:
comparing each of the characteristics of each wireless access point to a stored criticality rating for each characteristic;
comparing the wireless access points that have the characteristic with the highest criticality rating;
among the wireless access points that have the characteristic with the highest criticality rating, comparing those wireless access points that have the characteristic with the next lower criticality rating; and
continuing the previous comparing for each lower criticality rating; and
means for identifying the preferred access point from the plurality of wireless access points based on the evaluation of the characteristics of the wireless access points for which the characteristics have been retrieved, wherein the preferred access point is among the wireless access points that have been compared from highest criticality to lowest criticality rating.

20. A method of connecting a wireless station to a wireless network, comprising:
prior to associating to a preferred access point from among a plurality of wireless access points, receiving a pre-connection management signal from each of the plurality of wireless access points, wherein:
each of the wireless access points connects an upstream network that is upstream of the access point to a downstream wireless network that is downstream of the access point, and
each of the pre-connection management signals conveys information regarding services available from the upstream network that connects to the wireless access point corresponding to the pre-connection management signal;
from each of the received pre-connection management signals, retrieving characteristics of the wireless access point corresponding to the pre-connection management signal, wherein:
the characteristics comprise information regarding an availability status of a DHCP support capability of the upstream network that connects to the wireless access point corresponding to the pre-connection management signal;
for each wireless access point for which the characteristics have been retrieved, evaluating the characteristics of the wireless access point, wherein the evaluating includes:
comparing each of the characteristics of each wireless access point to a stored criticality rating for each characteristic;
comparing the wireless access points that have the characteristic with the highest criticality rating;
among the wireless access points that have the characteristic with the highest criticality rating, comparing those wireless access points that have the characteristic with the next lower criticality rating; and
continuing the previous step for each lower criticality rating; and based on the evaluation of the characteristics of the wireless access points for which the characteristics have been retrieved, identifying the preferred access point from the plurality of wireless access points, wherein the preferred access point is among the wireless access points that have been compared from highest criticality rating to lowest criticality rating.

* * * * *